United States Patent Office 3,150,931
Patented Sept. 29, 1964

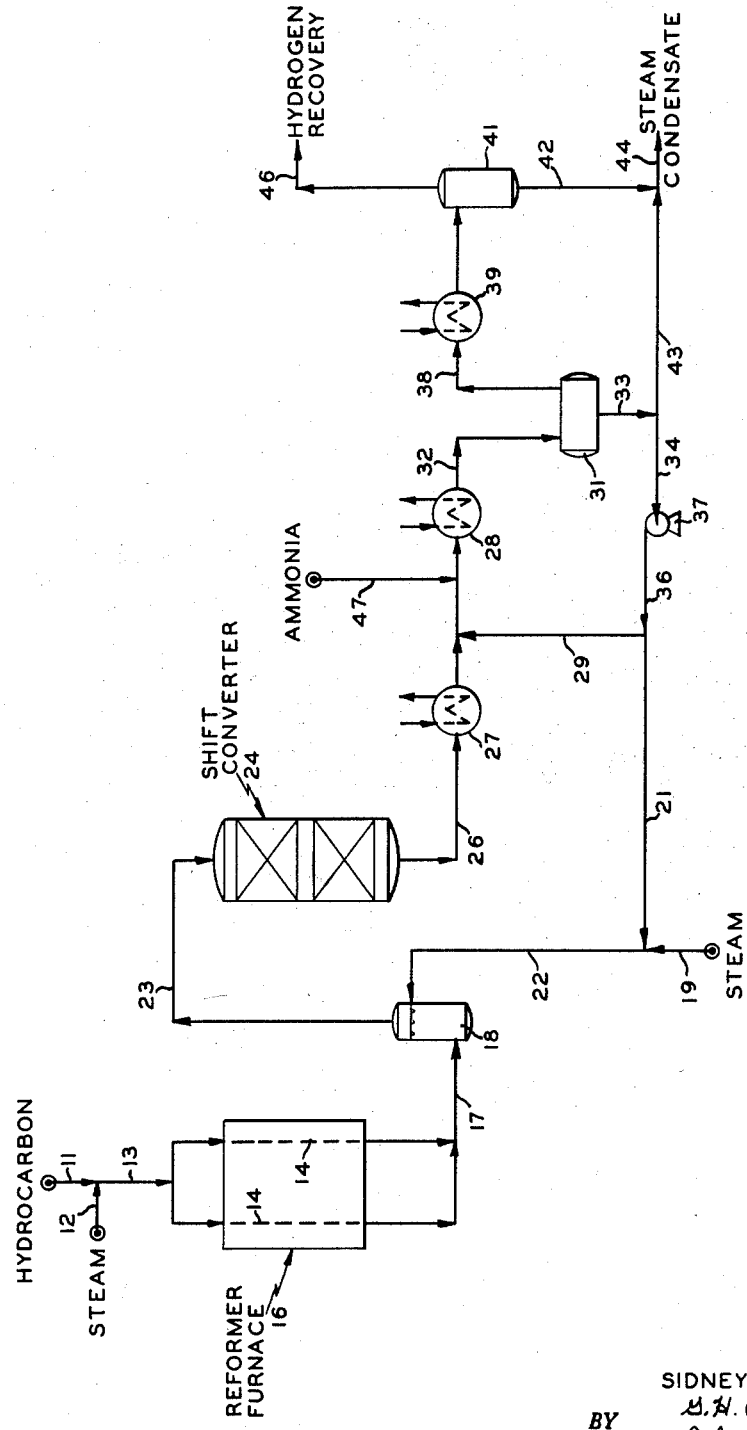

3,150,931
REDUCING CORROSION IN HYDROGEN
PRODUCTION
Sidney M. Frank, Chatham, N.J., assignor, by mesne
assignments, to Pullman Incorporated, a corporation of
Delaware
Filed May 16, 1961, Ser. No. 110,406
6 Claims. (Cl. 23—213)

The present invention relates to the production of hydrogen, and in particular, to a method for reducing corrosion in process equipment adapted to the production of hydrogen from hydrocarbons.

One of the most efficient methods for producing hydrogen from hydrocarbons involves reacting the hydrocarbon with steam and/or oxygen, at elevated temperatures, either in the presence or absence of a catalyst, in a gas generation zone maintained under suitable conditions to produce hydrogen and carbon monoxide, cooling the effluent of the gas generation zone to a lower temperature, contacting the cooled effluent in the presence of a shift conversion catalyst in a shift conversion zone maintained under suitable conditions to produce carbon dioxide and additional hydrogen by the reaction of carbon monoxide and steam, cooling the effluent of the shift conversion zone to condense steam, separating uncondensed materials and steam condensate, and recovering hydrogen from the uncondensed materials. The product hydrogen is a useful raw material in a number of commercially important processes including, for example, the hydrogenation of unsaturated hydrocarbons and the synthesis of methanol, hydrocarbons by Fischer-Tropsch, ammonia and urea.

As indicated, the hydrogen process includes cooling of the effluent of the gas generation zone before it is passed to the shift conversion zone and cooling of the effluent of the shift conversion zone to condense steam. Either or both of these two cooling steps can be carried out in whole or in part by indirect heat exchange between the hot effluent and cooler fluids. One of the most efficient methods for carrying out at least part of each of these cooling steps involves circulating a portion of the steam condensate separated from the shift converter effluent and injecting it directly into the effluent stream to be cooled. Unfortunately, however, it has been found that, regardless of the method used to cool, the process equipment made of standard carbon steel which is contacted by steam condensate is corroded at excessive rates. Tests indicate that the steam condensate has a relatively low pH, for example, a pH of about 5. It it postulated that carbon dioxide present in the gas is absorbed by the steam condensate to an extent sufficient to render it acidic and therefore corrosive. Substitution of alloy piping and equipment having suitable resistance to corrosion constitutes an uneconomic solution to the problem.

It is therefore a principal object of the present invention to provide a method for reducing corrosion in a system used for the production of hydrogen.

Another object of the invention is to provide a method for rendering steam condensed in a system used for the production of hydrogen substantially non-corrosive, thereby permitting the use of standard carbon steel piping and equipment in the system.

Another object of the invention is to provide a method for reducing corrosion in a circulating condensate system used in conjunction with a system for the production of hydrogen.

Another object of the invention is to provide a method for rendering steam condensate, circulated in a system for the production of hydrogen from hydrocarbons, substantially non-corrosive, thereby permitting the use of standard carbon steel piping and equipment in the system.

Various other objects and advantages of the invention will be apparent to those skilled in the art from the following detailed discussion and description.

The above objects are accomplished in accordance with the invention by the addition of controlled amounts of ammonia at selected points in the system.

For a better understanding of the invention, reference is had to the accompanying drawing which shows in diagrammatic form suitable apparatus for carrying out a preferred embodiment of the invention. Referring to the drawing, feed hydrocarbon and steam are introduced respectively through lines 11 and 12. The combined stream in line 13 is passed through a plurality of fired tubes 14 disposed in the radiant section of reformer furnace 16. The fired tubes 14 are packed with suitable steam reforming catalyst which promotes reaction of the feed materials to form hydrogen and carbon monoxide. A fuel is burned, by means not shown, externally of the tubes 14 in furnace 16 to provide the required heat for the endothermic reforming reaction in tubes 14.

The hot effluent of furnace 16 containing appreciable amounts of hydrogen and carbon monoxide is passed through line 17 to a quench drum 18. Steam from line 19 and steam condensate from line 21 are passed through line 22 to distributors in drum 18. The hot reformer effluent is cooled to a temperature suitable for subsequent shift conversion by direct contact with, and vaporization of, the quench fluid introduced through line 22. In addition to cooling the gas in drum 18, the condensate-steam mixture introduced through line 22 serves to add sufficient steam to the gas to provide the requirements of subsequent shift conversion.

After the temperature of the reformer effluent is adjusted to a suitable level for shift conversion, it is withdrawn from drum 18 through line 23 and is introduced into a shift converter 24 wherein it contacts shift conversion catalyst which promotes the reaction of carbon monoxide and steam to form carbon dioxide and additional hydrogen.

The effluent of shift converter 24 is withdrawn through line 26 and cooled to condense steam. As shown on the drawing, the cooling is done by a combination of indirect heat exchange in heat exchangers 27 and 28 with cooler fluids and of direct heat exchange with relatively cold circulating steam condensate supplied through line 29. As a result of this cooling, the shift converter effluent which is finally introduced into separation drum 31 from line 32 is partially condensed. Steam condensate is separated in drum 31, withdrawn through line 33 and recirculated in part to lines 21 and 29 through lines 34 and 36 by means of pump 37 to provide quenching medium.

The uncondensed material separated in drum 31 is withdrawn through line 38, further cooled by indirect heat exchange with a colder fluid in heat exchanger 39 and passed to a separation drum 41. Additional steam is condensed by this further cooling and additional steam condensate separates in drum 41. The latter is withdrawn in line 42, combined with that portion of the condensate from line 33 which is in line 43 and delivered from the process through line 44. Uncondensed material separated in drum 41 is withdrawn therefrom in line 46 and is delivered from the process as the hydrogen-rich product. Depending upon the purity requirements for the hydrogen produced by the process, the hydrogen-rich fraction in line 46 can be used directly or after further purification.

In order to reduce corrosion in process equipment contacted by steam condensate, ammonia is added to the process through line 47. Thus, steam condensed in exchanger 28 immediately absorbs ammonia from the vapor thereby rendering the condensate non-corrosive to the piping and equipment which it thereafter contacts. Generally, sufficient ammonia will be absorbed in the steam condensed so that it will be unnecessary to add further ammonia to the condensate in any of lines 33, 34, 36, 21, 29 or 43 to effectively reduce the corrosiveness of such condensate, although it should be understood that ammonia can be added to the condensate in any of these lines either in addition to that added through line 47 or as an alternative thereto. Similarly, sufficient ammonia will generally be present in the uncondensed fraction separated in drum 31 to reduce corrosion in heat exchanger 39 and the process equipment downstream therefrom contacted by additional condensed steam, although, again, additional ammonia can be added either to line 38 or line 42 if necessary or desirable. In any case, ammonia is provided at such point or points as to insure that all of the steam condensate is substantially non-corrosive to the process equipment with which it comes in contact. Ammonia can be added as the compound or in the form of an aqueous solution.

It is important to note that while ammonia will be present in the process illustrated either as vapor or as an aqueous solution or both throughout the process downstream from quench drum 18, it is entirely inert in the process. Thus, it takes no part in any reaction proceeding in shift converter 24 nor does it in any way adversely affect the shift conversion catalyst therein.

The amount of ammonia which is added to reduce corrosion in the process should be sufficient to provide an ammonia concentration in the steam condensate of above about 10 p.p.m. Lesser amounts will cause some reduction in the corrosiveness of the steam condensate but, in general, not a sufficient reduction to permit economic use of carbon steel piping and equipment. Since the ammonia is inert, at least with respect to the process discussed thus far, there is no upper limit to the amount of ammonia which can be added. However, it is preferred to limit the ammonia added to an amount sufficient to provide an ammonia concentration in the steam condensate of about 10 to about 1000 p.p.m., more usually about 200 to about 300 p.p.m. In this connection, the added ammonia should be sufficient to raise the pH of the steam condensate to a value of about 6.5 to about 8.5, preferably about 7.0 to about 7.5. It is significant to note that only a limited amount of ammonia need be added to affect the indicated adjustment of pH. The added ammonia does not simply increase the solubility of carbon dioxide in the steam condensate so that unlimited quantities of ammonia would be required. An equilibrium is in fact reached which prevents further solution of carbon dioxide and thereby permits raising the solution pH with only a very small quantity of added ammonia.

As indicated, it is preferred to limit the amount of ammonia which is added to certain values even though there is no objection to adding greater amounts from the standpoint of the process which has been discussed thus far. In instances where the product hydrogen in line 46 is subjected to certain further treatment or where the steam condensate in line 44 is subjected to certain further treatment, it is quite important that the ammonia concentration in these streams be so limited. For example, where the hydrogen product in line 46 is treated for the separation and recovery of carbon dioxide in an amine absorption-stripping system to provide a carbon dioxide product suitable for use in urea synthesis, very little ammonia is permissible in line 46. If excessive amounts of ammonia are present there, such ammonia may well appear in the carbon dioxide product which, when compressed to the elevated pressure required in urea synthesis, might be accompanied with precipitation of ammonium carbonate or carbamate. In connection with the steam condensate recovered in line 44, this excess condensate is frequently supplied to the deaerator and boiler of the plant steam generating system. Such systems frequently include brass and bronze parts which are susceptible to corrosion by alkaline solution. While the deaerator will remove at least some ammonia, it may not be able to remove sufficient ammonia in cases where the steam condensate in line 44 has an unduly high pH. Thus, in either of these circumstances, it is important to limit the amount of ammonia added to the circulating condensate system to values within the preferred ranges mentioned in order to avoid the problems discussed.

The hydrocarbon gasification process used can be any one of many which are well known in the art. Thus, while catalytic steam reforming in fired tubes is shown in the drawing and is preferred, the hydrocarbon can also be gasified by partial oxidation with substantially pure oxygen or by a combination of catalytic steam reforming and such partial oxidation in heated or adiabatic apparatus. Conditions used in each of these gasification processes are well known and are therefore not discussed further here. Similarly, suitable catalysts and conditions for shift conversion are well known and therefore require no further discussion. No invention is claimed in the gas generation and shift conversion system per se but in the method of reducing corrosion in process equipment contacted by steam condensate in such a system.

Regardless of the gasification process which is used, the effluent of the gasification zone will be at a higher temperature than can suitably be used in subsequent shift conversion. Accordingly, it will be useful in all such processes to practice a quenching operation on the effluent such as is done in quench drum 18 of the specific process illustrated in the drawing. Suitable inlet temperatures for the shift conversion zone include values of about 600 to about 800° F., preferably about 650 to about 750° F. Thus, sufficient condensate is used as quench to reduce the temperature of the effluent of the gas generation zone to a temperature in this range. Where vaporization of condensate provides insufficient steam to meet requirements of shift conversion, steam can also be supplied along with the condensate to satisfy the requirements. In connection with cooling the effluent of the shift conversion zone, it should be understood that all of the cooling done can be done by injecting circulated condensate. However, where other parts of the process require heat at levels available in the effluent of the shift converter, then it is advantageous to do some or all of the cooling in indirect heat exchangers as shown. In any case, steam is condensed and, accordingly, the method of the present invention is applicable.

As a specific example of the present invention, a product containing about 74.7 mol percent hydrogen, on a water-free basis, was produced from natural gas by the process illustrated in the drawing. The approximate quantities and compositions of the principal streams involved are set out in the accompanying table which refers to each stream according to its line number on the drawing. The desulphurized natural gas fed in line 11 at about 100° F. and about 170 p.s.i.g., was combined with about 18,610 lbs. per hour of steam at about 170 p.s.i.g. and about 485° F. The combined feed in line 13 at about 350° F. was contacted in the presence of a standard commercial nickel reforming catalyst in tubes 14 of reformer furnace 16. The effluent of furnace 16 in line 17 at about 1545° F. and about 125 p.s.i.g. was contacted in quench drum 18 with about 9,630 lbs. per hour of steam from line 19 and about 775 barrels per stream day (b.p.s.d.) of steam condensate from line 21 which together were introduced through line 22. The cooled reformer effluent in line 23 at about 650° F. was passed over two fixed beds of standard commercial iron oxide shift conversion catalyst in shift converter 24. The effluent of shift converter 24 in line 26 at about 750° F. and about 118 p.s.i.g. was cooled in heat exchanger 27 to about 658° F. by indirect heat exchange with a cooler fluid. The shift converter effluent was further cooled to about 305° F. by the injection of about 708 b.p.s.d. of steam condensate through line 29. In heat exchanger 28, the effluent was still further cooled and was partially condensed at a temperature of about 260° F. by indirect heat exchange with a colder fluid. About 2070 b.p.s.d. of steam condensate at 260° F. was separated in drum 31 and withdrawn through line 33. Of this steam condensate, about 1483 b.p.s.d. was diverted through line 34 and passed by pump 37 through line 36 to lines 21 and 29 to provide quench. Uncondensed materials were withdrawn from drum 31 through line 38, cooled to about 115° F. in heat exchanger 39 by indirect heat exchange with cooling water and passed to separation drum 41. About 850 b.p.s.d. of additional steam condensate was separated in drum 41 and withdrawn through line 42, combined with about 587 b.p.s.d. of condensate in line 43 and together passed at a combined temperature of about 174° F. to the plant boiler house for steam generation. The hydrogen-rich product of the process separated in drum 41 as uncondensed material was withdrawn from the process through line 46. In this particular instance, the product was further treated in an amine absorption-stripping system to separate substantially pure carbon dioxide for use in urea synthetisis and substantially pure hydrogen for use in ammonia synthesis.

On start-up of the foregoing plant, there occurred excessive corrosion of process equipment coming into contact with steam condensate. The latter was tested and found to have a pH of about 5.2. After the provision of line 47 through which about 3.5 lbs. of ammonia per hour were added, it was found that the corrosion rate was appreciably reduced in the steam condensate system. Hence, it was economically feasible to maintain ordinary carbon steel process equipment in the system and avoid the great expense of replacing such equipment with stainless steel.

TABLE

*Composition of Principal Streams, Mols/Hr.*

| Component | 11 | 17 | 26 | 46 |
|---|---|---|---|---|
| $H_2$ | | 1,138.4 | 1,353.7 | 1,353.7 |
| $CO$ | | 245.0 | 29.7 | 29.7 |
| $CO_2$ | 1.4 | 111.2 | 326.5 | 326.5 |
| $H_2O$ | | 569.4 | 1,515.0 | 22.0 |
| $CH_4$ | 398.3 | 103.0 | 103.0 | 103.0 |
| $N_2$ | 0.1 | 0.1 | 0.1 | 0.1 |
| $C_2H_6$ | 15.1 | | | |
| $C_3H_8$ | 4.8 | | | |
| $C_4H_{10}$ | 2.1 | | | |
| $C_5H_{12}$ | 0.7 | | | |
| $C_6H_{14}+$ | 0.5 | | | |
| | 423.0 | 2,167.1 | 3,328.0 | 1,835.0 |

It should be apparent that many modifications can readily be made by those skilled in the art in the foregoing process without departing from the scope of the invention. Thus, for example, it is apparent that the particular sequence of indirect heat exchange, direct heat exchange and indirect heat exchange of the shift converter effluent in line 26 can be varied to suit particular process situations. Similarly, steam can be condensed and separated in a single stage or in three or more stages rather than the two stages specifically described. It is apparent that the circulated condensate can be furnished entirely from a lower temperature stage of condensate separation or from a combination of low and high temperature stages rather than entirely from the high temperature stage specifically described. These examples are merely illustrative of some of the various changes which can be made without departing from the scope of the present invention.

I claim:

1. In a process for the production of hydrogen comprising contacting a gas containing carbon monoxide with steam in a shift conversion zone maintained under suitable conditions to produce hydrogen and carbon dioxide, and cooling the effluent of the shift conversion zone to condense steam, the improvement for reducing corrosion in process equipment contacted by steam condensate which comprises adding ammonia to said process at a point upstream from where steam condenses in an amount sufficient to adjust the pH of said steam condensate to a value of about 6.5 to about 8.5.

2. In a process for the production of hydrogen comprising contacting a gas containing carbon monoxide with steam in a shift conversion zone maintained under suitable conditions to produce hydrogen and carbon dioxide, cooling the effluent of the shift conversion zone to condense steam, separating uncondensed materials and steam condensate, withdrawing said uncondensed materials as hydrogen product, and injecting at least a portion of said separated steam condensate into the effluent of said shift conversion zone to achieve at least a part of the aforesaid cooling thereof, the improvement for reducing corrosion in process equipment contacted by steam condensate which comprises adding ammonia to said process in an amount sufficient to adjust the pH of said steam condensate to a value of about 6.5 to about 8.5.

3. In a process for the production of hydrogen comprising gasifying a hydrocarbon in a gas generation zone to produce hydrogen and carbon monoxide, cooling the effluent of the gas generation zone, contacting cooled effluent of the gas generation zone with steam in a shift conversion zone maintained under suitable conditions to produce carbon dioxide and additional hydrogen by reaction of carbon monoxide with steam, cooling the effluent of the shift conversion zone to condense steam, separating uncondensed materials and steam condensate, withdrawing said uncondensed materials as hydrogen product, and injecting at least a portion of said separated steam condensate into at least one of said effluents to achieve at least a part of the aforesaid cooling thereof, the improvement for reducing corrosion in process equipment contacted by steam condensate which comprises adding ammonia to said process in an amount sufficient to adjust the pH of said steam condensate to a value of about 6.5 to about 8.5.

4. In a process for the production of hydrogen comprising gasifying a hydrocarbon in a gas generation zone to produce hydrogen and carbon monoxide, cooling the effluent of the gas generation zone, contacting cooled effluent of the gas generation zone with steam in a shift conversion zone maintained under suitable conditions to produce carbon dioxide and additional hydrogen by reaction of carbon monoxide with steam, cooling the effluent of the shift conversion zone to condense steam, separating uncondensed materials and steam condensate, withdrawing said uncondensed materials as hydrogen product, and injecting at least a portion of said separated steam condensate into the effluent of the gas generation zone to achieve at least a part of the aforesaid cooling thereof, the improvement for reducing corrosion in process equipment contacted by steam condensate which comprises adding ammonia to said process in an amount sufficient to adjust the pH of said steam condensate to a value of about 6.5 to about 8.5

5. In a process for the production of hydrogen comprising contacting a hydrocarbon with steam in the presence of a reforming catalyst in a reforming zone maintained under suitable conditions to produce hydrogen and carbon monoxide, cooling the effluent of the reforming zone to a temperature between about 600 and about 800° F., contacting cooled effluent from the reforming zone with steam in the presence of a shift conversion catalyst in a shift conversion zone maintained under suitable conditions to produce carbon dioxide and additional hydrogen by reaction of carbon monoxide and steam, cooling the effluent of the shift conversion zone to a temperature below its dewpoint, separating uncondensed materials and steam condensate, withdrawing uncondensed materials as hydrogen product, and injecting at least a portion of said separated steam condensate into at least one of said effluents to achieve at least a part of the aforesaid cooling thereof, the improvement for reducing corrosion in process equipment contacted by steam condensate which comprises adding controlled amounts of ammonia to the process to adjust the pH of said steam condensate to about 6.5 to about 8.5.

6. The improved process defined in claim 5 in which sufficient separated steam condensate is injected into the effluent of said reforming zone to achieve substantially all of the cooling recited for the effluent of said reforming zone.

References Cited in the file of this patent

UNITED STATES PATENTS

| | | |
|---|---|---|
| 2,344,404 | Giloy | Mar. 14, 1944 |
| 2,357,559 | Smith | Sept. 5, 1944 |
| 2,465,235 | Kubicek | Mar. 22, 1949 |
| 2,892,685 | Paull | June 30, 1959 |